United States Patent [19]
Kaiser

[11] 3,916,336
[45] Oct. 28, 1975

[54] RADIANT ENERGY DEVICE MOUNT

[75] Inventor: Donald Bernard Kaiser, Lancaster, Pa.

[73] Assignee: RCA Corporation, New York, N.Y.

[22] Filed: Feb. 22, 1974

[21] Appl. No.: 444,973

Related U.S. Application Data

[62] Division of Ser. No. 393,624, Aug. 31, 1973.

[52] U.S. Cl. ............................ 331/94.5 D; 330/4.3
[51] Int. Cl.² .......................................... H01S 3/02
[58] Field of Search .................... 331/94.5; 330/4.3; 313/220

[56] References Cited
UNITED STATES PATENTS

| | | | |
|---|---|---|---|
| 3,553,604 | 1/1971 | Andress et al. ................ | 331/94.5 T |
| 3,739,297 | 6/1973 | Mark ............................. | 331/94.5 D |
| 3,784,927 | 1/1974 | Rudolph ....................... | 331/94.5 D |

*Primary Examiner*—William L. Sikes
*Attorney, Agent, or Firm*—Glenn H. Bruestle

[57] ABSTRACT

A radiant energy device, typically a gas laser tube, is mounted within a continuous-walled housing which is in alignment with the radiant output, e.g., laser beam, of the device.

6 Claims, 4 Drawing Figures

RADIANT ENERGY DEVICE MOUNT

This application is a division of application Ser. No. 393,624, filed Aug. 31, 1973.

BACKGROUND OF THE INVENTION

This invention relates to a novel radiant energy device assembly and, particularly, to a gas laser tube mounted within a continuous-walled tubular housing.

Radiant energy devices such as gas laser tubes are often mounted within protective tubular housings. Such devices are employed, for example, in laser transit systems, wherein both the laser tube and its protective housing are generally cylindrically in shape. For these and other type systems, it is frequently desirable, if not necessary, to mount the laser tube so that the coherent light beam therefrom is in permanent, substantially-coaxial relationship, i.e., permanently aligned, with the protective housing.

To effect such a permanent alignment, gas laser tube mounts typically comprise a protective housing having a plurality of apertures which must be formed in the wall thereof. Such apertures are required to accommodate temporary adjusting means for aligning the beam and the housing and also to facilitate the formation of permanent elastomer pads between the laser tube and its housing. To prevent the introduction of dirt and other harmful substances into the laser tube-housing interspace, each of these apertures must eventually be sealed off in a satisfactory manner. Thus, the final mount is not only costly to produce, but also aesthetically unpleasing.

SUMMARY OF THE INVENTION

The novel radiant energy device assembly comprises a radiant energy device mounted within a housing having a continuous wall, the radiant output of the device being in fixed geometrical relationship with the housing. The outer surface of the device has a plurality of spacers attached thereto and in contact with the inner surface of the housing wall. Means are provided for retaining the device within the housing.

Preferably, the radiant output is light, emitted as a beam, e.g., from a laser tube. Also preferably, the output beam from the laser tube is in substantially-coaxial relationship with a tubular housing. The plurality of spacers may comprise two or more sets of spacers each disposed in a separate plane perpendicular to the axis of the laser tube. The spacers are made typically of an elastomer adhesive material.

DESCRIPTION OF THE PREFERRED EMBODIMENT

Figure 4:
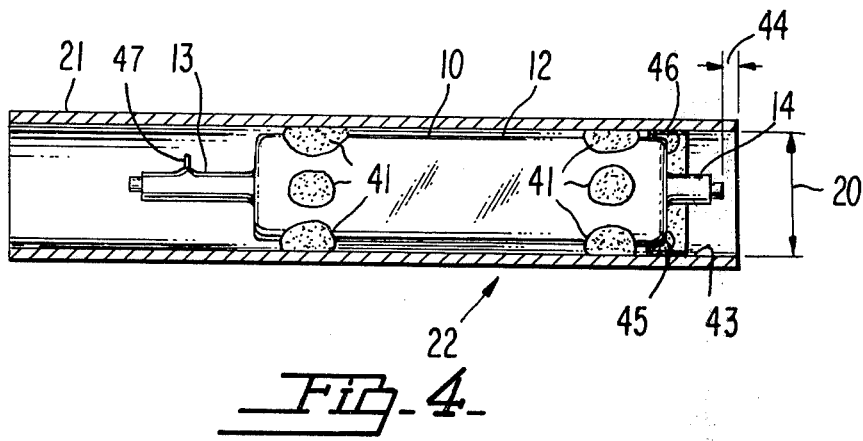
FIG. 4 is a longitudinal view, partly in axial section, of an example of the novel mount comprising the pre-aligned laser tube of FIG. 3 and a continuous-walled cylindrical housing.

An example of the novel radiant energy device assembly is shown in FIG. 4, which depicts a typical gas laser tube 10 mounted within a continuous-walled cylindrical, i.e., tubular, housing 21. The laser tube 10, shown also in FIGS. 1 and 2, comprises a large-diameter glasss bulb 12 sealed, at one end thereof, to a first glass capillary 13, and at the other end thereof, to a second glass capillary 14. Attached to and sealing the left end of the first capillary 13 is a reflecting mirror 15, and attached to and sealing the right end of the second capillary 14 is an output mirror 16. An anode 47 extends through the wall of the first capillary 13, and a cylindrical cold cathode (not shown) is located within the bulb 12. The preferred method of mounting the laser tube 10 within the housing 21 is described below.

Figure 1:
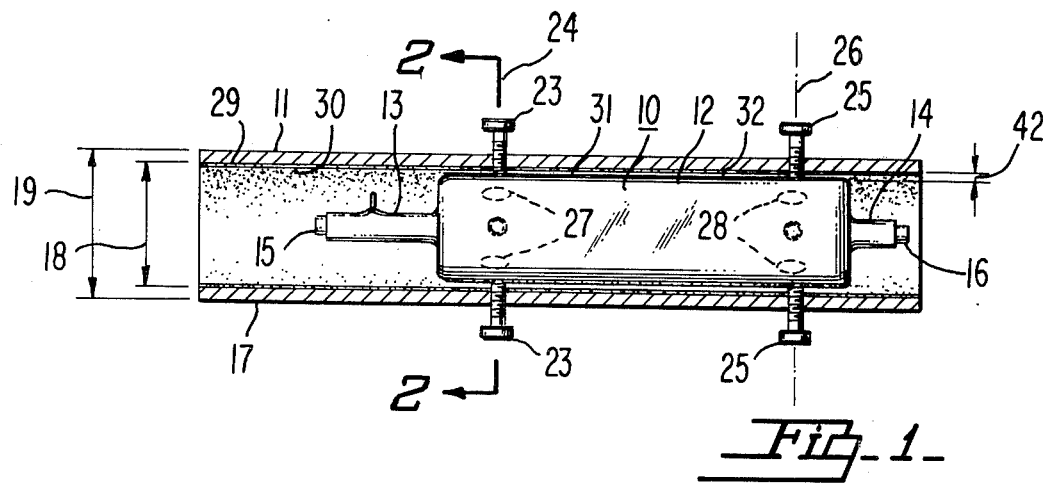
FIG. 1 is a longitudinal view, partly in axial section, of a laser tube positioned within an alignment fixture.
Figure 2:
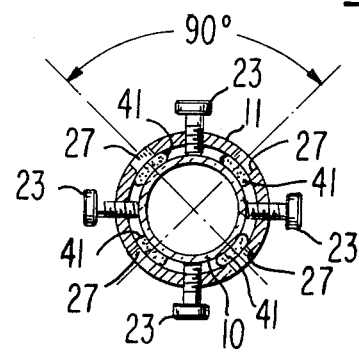
FIG. 2 is a sectional view, along the line 2—2, of the laser tube and alignment fixture of FIG. 1.

As illustrated in FIGS. 1 and 2, the laser tube 10 is positioned within an alignment fixture 11. The fixture 11 comprises a metal cylinder 17 having concentric internal and external diameters 18 and 19, respectively, the internal diameter 18 of the cylinder 17 being equal to the internal diameter 20 of the continuous-walled tubular housing 21 shown in FIG. 4. Prior to such positioning, the internal surface 29 of the cylinder 17 is coated with a layer 30 of an adhesive release agent such as No. MS-122 Fluorocarbon Release Agent, marketed by Dow Corning Inc., and the external surface 31 of the bulb portion 12 of the laser 10 is coated with a layer 32 of an adhesive primer such as No. 1200 Primer, also marketed by Dow Corning Inc.

The alignment fixture 11 also comprises a first set of four threaded adjustment members 23 extending through the wall of the cylinder 17, in a first plane 24 nearer the left end of the laser tube 10; and a second set of four threaded adjustment members 25 extending through the wall of the cylinder 17, in a second plane 26 nearer the right end of the laser tube 10. Each of the planes 24 and 26 is perpendicular to the axis of the cylinder 17; and, in each plane 24 or 26, the adjustment members 23 or 25, respectively, are angularly spaced at angles of 90°. Also located in the first plane 24, and interspaced with the first set of adjustment members 23, is a first set of four fill apertures 27 formed in the wall of the cylinder 17. A second set of fill apertures 28, also formed in the wall of the cylinder 17, is located in the second plane 26 and interspaced with the second set of adjustment members 25.

Figure 3:
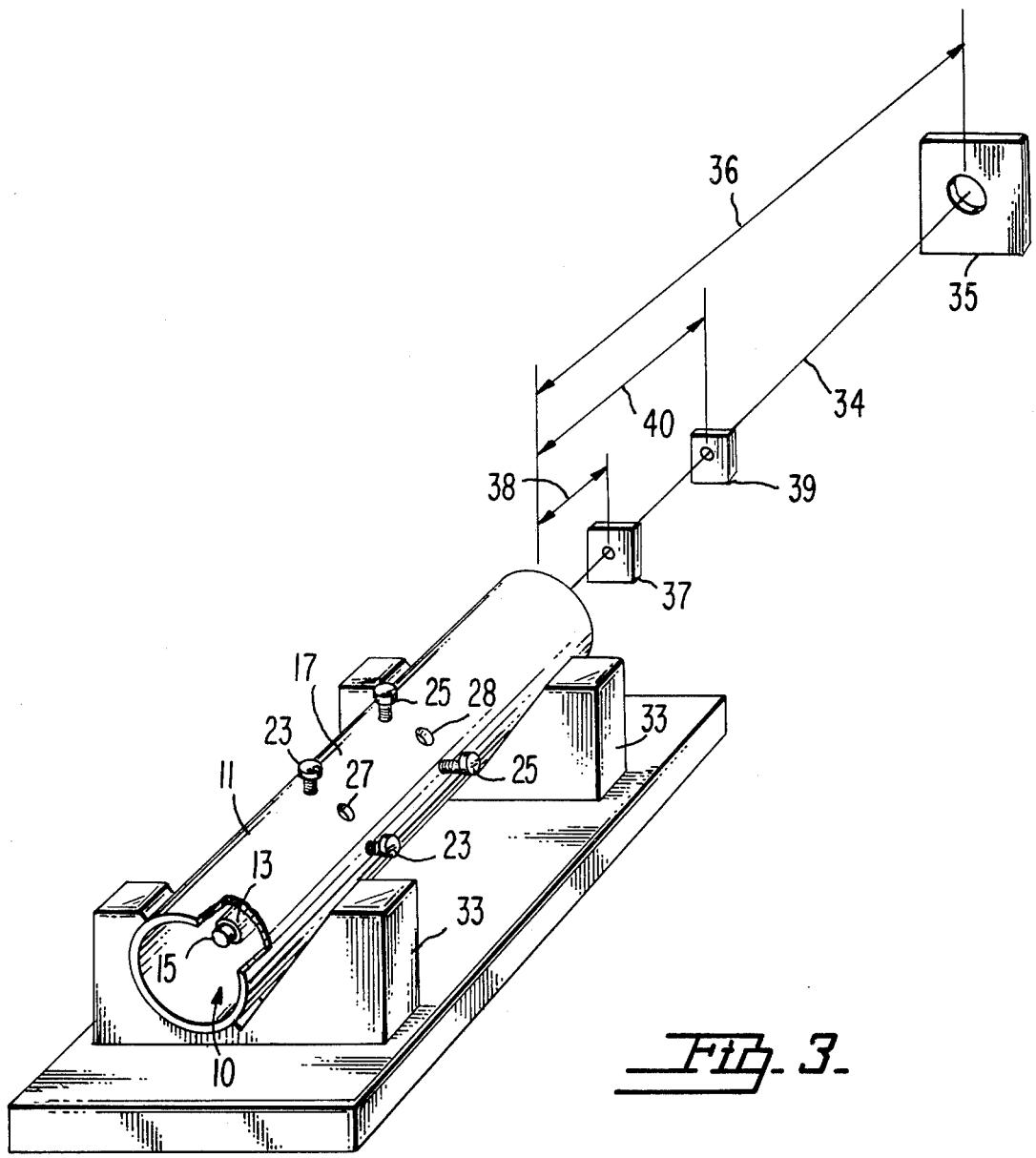
FIG. 3 is a perspective view of the laser tube and alignment fixture of FIGS. 1 and 2, illustrating a method of pre-aligning the beam from the laser tube.

The laser tube 10 is roughly centered within the alignment fixture 11 by means of the adjustment members 23 and 25, after which the fixture 11 is positioned in an alignment range, as depicted in FIG. 3, by means of a pair of V-blocks 33, shown therein. The anode 47 and cathode of the laser tube 10 are connected to a suitable power supply (not shown), whereby the tube is operated to produce a coherent light output beam 34. The laser beam 34 is directed at a target 35, located at a distance 36, typically about 150 feet, from the output mirror 16 of the laser tube 10. Then the alignment fixture 11 is rotated in the V-blocks 33; and the adjustment members 23 and 25 are turned to reposition the laser tube 10 within the fixture, so that the laser beam 34 remains within a typically 3-inch diameter circle at the target 35 during a full 360° rotation of the alignment fixture 11.

Next, a first screen 37 is located at a distance 38, typically about 4 inches, from the output mirror 16 of the laser tube 10. Again the alignment fixture 11 is rotated in the V-blocks 33. The first set only of adjustment members 23 is then employed to more accurately reposition the laser tube 10 within the fixture, so that a displacement monitor (not shown) at the first screen 37 records less than a 0.050-inch runout of the laser beam 34 during a full 360° rotation of the alignment fixture 11. Finally, a second screen 39 is located at a distance 40, typically about 48 inches, from the output mirror 16 of the laser tube 10. Once again the alignment fixture 11 is rotated in the V-blocks 33. This time the second set only of adjustment members 25 is employed to even more accurately reposition the laser tube 10 within the fixture so that a displacement monitor (not shown) at the second screen 39 also records less than a 0.050-inch runout of the laser beam 34 during a full 360° rotation of the alignment fixture 11. The laser beam 34 is then in substantially-coaxial relationship, i.e., aligned, with the metal cylinder 17 of the alignment fixture 11. The electrodes of the laser tube 10 are disengaged from the power supply, and the alignment fixture 11 is removed from the V-blocks 33.

Approximately equal quantities of a liquid elastomer adhesive material are then injected into the fill apertures 27 and 28 of the cylinder 17, the quantity of material injected into each aperture being sufficient to form an alastomer pad 41 having a diameter of about ½ to ⅝ inch and extending across the laser tube 10-cylinder 17 interspace. The preferred material is a self-curing silicon-rubber elastomer material such as No. 311 Encapsulant with Cab-O-Sil, marketed by Dow Corning Inc. After the eight fill apertures 27 and 28 are filled, the liquid elastomer material is allowed to cure and solidify. The curing time for No. 311 encapsulant with Cab-O-Sil is about 4 hours at room temperature and about 1 hour at 150°F.

After the curing step, the laser tube 10 is removed from the alignment fixture 11. The adjustment members 23 and 25 are removed from contact with the laser tube 10, and the tube is pushed out through the cylinder 17 by applying a gradual force against the output mirror 16. The eight formed pads 41 adhere to the bulb portion 12 of the lasers tube 10, which had been coated with the layer 32 of adhesive primer, but not to the internal surface 29 of the cylinder 17, which had been coated with the layer 30 of adhesive release agent; hence, the pads 41 are removed with the laser tube 10.

As shown in FIG. 4, the laser tube 10 is next positioned within the continuous-walled cylinder housing 21, the output mirror 16 of the tube being located at a distance 44, typically about ½ inch, inside one, e.g., the right, end of the housing. To axially retain the laser tube 10 into the housing 21, a coating 45 of an adhesive primer such as No. 1200 Primer is applied to the internal surface 43 of the housing, at least on a portion thereof adjacent the right end of the bulb portion 12 of the laser tube. Then a quantity of a liquid elastomer adhesive material such as No. 311 Encapsulant with Cab-O-Sil is injected into the laser tube 10-housing 21 interspace 42 (shown in FIG. 1), the quantity of material injected therein being sufficient to form a plurality of, e.g., two, buttons 46 each having a diameter of about ¼ to ⅝ inch and extending across the interspace 42. The liquid elastomer material is allowed to cure and solidify as described above, and the buttons 46 so formed adhere to the bulb portion 12 of the laser tube 10 and also to the internal surface 43 of the housing 21. The laser tube 10 is thus permanently mounted within the continuous-walled cylindrical housing 21, and the laser output beam 34 is permanently aligned therewith.

GENERAL CONSIDERATIONS

It should be understood that this invention is not limited to the embodiment described above. For example, the radiant energy device may be other than a laser tube or light-emitting device. The continuous-walled housing within which the device is mounted may be other than cylindrical in shape; for example, it may have a substantially square, rectangular, or oval cross section. Also, the cross section may be nonuniform over its length. Similarly, the radiant energy device may have other than cylindrical geometry. The radiant output from the device may be in other than substantially-coaxial relationship with the housing; thus, the fixed geometrical relationship between the radiant output and the housing may be non-parallel.

The plurality of spacers attached to the outer surface of the radiant energy device and in contact with the inner surface of the housing wall may comprise other than two sets of four spacers each, disposed in separate planes perpendicular to the axis of the tube. That is, the number of spacers per set may vary, more than two sets of spacers may be employed, the plane of any set of spacers may be transverse to the axis of the tube, and/or the spacers may not even lie in any given plane. Also, the spacers may be made of other than a self-curing liquid elastomer adhesive material; and the means for retaining the tube within the housing may be other than two buttons, attached to both the outer surface of the tube and the inner surface of the housing wall, or made also of self-curing liquid elastomer adhesive material.

What is claimed is:

1. A radiant energy device assembly comprising a housing, a radiant energy device mounted within said housing, said device having a radiant output in fixed geometrical relationship with said housing; said housing having a continuous unbroken tubular wall; a plurality of spacers fixed to the outer surface of said device and in contact with the inner surface of said housing wall, said spacers being made of an adhesive elastomer material; and additional elastomer material adhesively fixed to said device and to said housing for retaining said device within said housing.

2. The radiant energy device assembly of claim 1, wherein said housing is tubular in shape, said radiant output being in fixed geometrical relationship with the axis of said housing.

3. The radiant energy device assembly of claim 1, wherein said device is a laser.

4. A laser assembly comprising a tubular housing, a laser tube for providing a light beam along a straight-line path, said laser tube mounted coextensively within said housing with said beam path having a substantially coaxial relationship with said housing; said housing having a continuous wall; a plurality of spacers fixed to the outer surface of said tube and in contact with the inner surface of said wall, said spacers being made of an elastomer adhesive material; and additional elastomer material attached to said outer surface of said tube and to said inner surface of said wall for retaining said tube within said housing.

5. The laser assembly of claim 4, wherein said plurality of spacers comprises at least two sets thereof, each set being disposed in a separate plane perpendicular to the axis of said tube.

6. The laser assembly of claim 4, wherein said spacers comprise hardened pads of said elastomer adhesive-material, said pads being preformed with a predetermined thickness to accurately space said tube from said inner surface of said housing wall.

* * * * *